United States Patent [19]

Scheffel

[11] Patent Number: 4,659,060
[45] Date of Patent: Apr. 21, 1987

[54] STEM TIP SEAL

[75] Inventor: Gary W. Scheffel, Streetsboro, Ohio

[73] Assignee: Nupro Company, Willoughby, Ohio

[21] Appl. No.: 829,187

[22] Filed: Feb. 14, 1986

[51] Int. Cl.[4] .............................................. F16K 1/36
[52] U.S. Cl. ..................... 251/332; 251/210
[58] Field of Search ........................ 251/332, 210, 900

[56] References Cited

U.S. PATENT DOCUMENTS

| 2,414,908 | 1/1947 | Smith | 251/27 |
| 2,885,176 | 5/1959 | Bryant | 251/172 |
| 2,936,154 | 5/1960 | Von Platen et al. | 251/332 |
| 3,084,903 | 4/1963 | Parks | 251/187 |
| 3,095,900 | 7/1963 | Newhall | 251/332 X |
| 3,809,362 | 5/1974 | Baumann | 251/332 |
| 4,341,370 | 7/1982 | Banks | 251/282 |

FOREIGN PATENT DOCUMENTS 654060 12/1962 Canada ............................. 251/332
893870 4/1962 United Kingdom .

Primary Examiner—Arnold Rosenthal
Attorney, Agent, or Firm—Fay, Sharpe, Fagan, Minnich & McKee

[57] ABSTRACT

A stem tip seal for a shut-off valve including a valve member adapted for selective movement axially toward and away from an associated valve seat. A generally cylindrical sleeve is carried by the valve member and has an end defining an outer annular seal surface adapted for cooperative sealing engagement with the seat. Mounted centrally within the sleeve for limited axial movement is a rigid cylindrical body that defines a first inner annular seal surface adapted for engagement with the seat at a location radially inwardly of the outer annular seal surface. Formed between the sleeve and the rigid body is an annular chamber which opens axially inwardly from a narrow slot located between the first inner annular seal surface and the outer annular seal surface. A mass of resilient packing material substantially fills the chamber and extends axially outwardly of the slot to define a second inner annular seal surface. Means are associated with the rigid body for generating pressure on the packing material when the body is forced axially toward the valve member. In addition, the first inner annular seal surface is configured to engage the seat prior to engagement by either the second inner annular seal surface or the outer annular seal surface.

12 Claims, 5 Drawing Figures

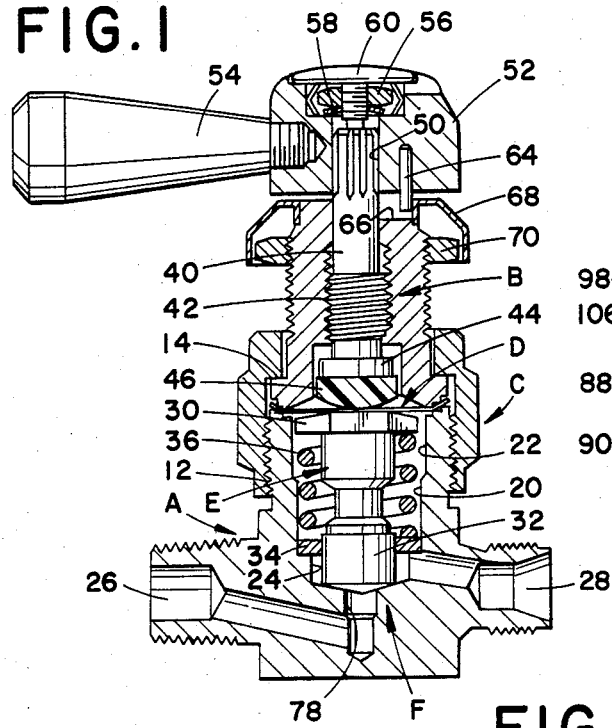
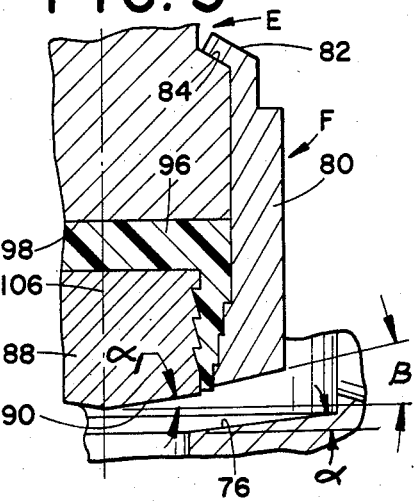
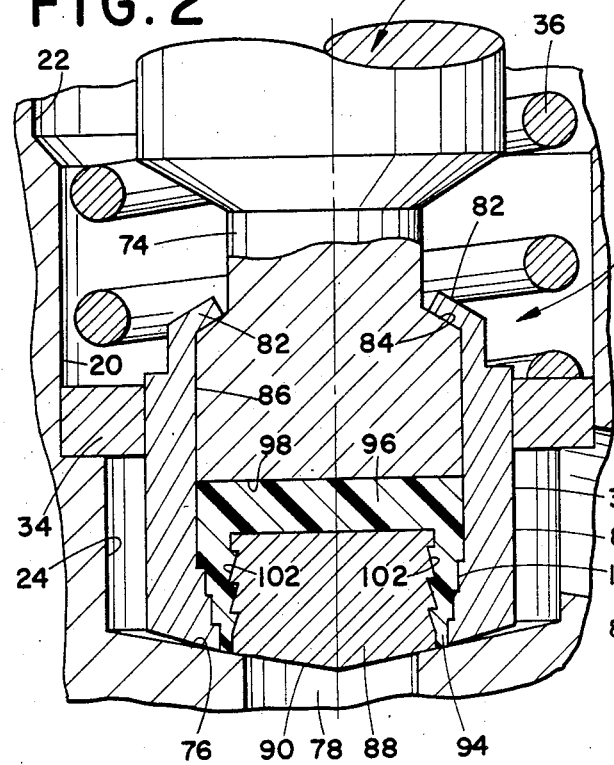
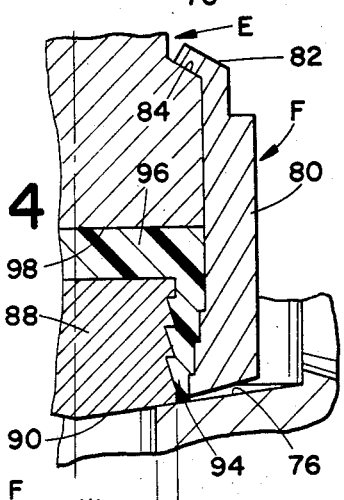
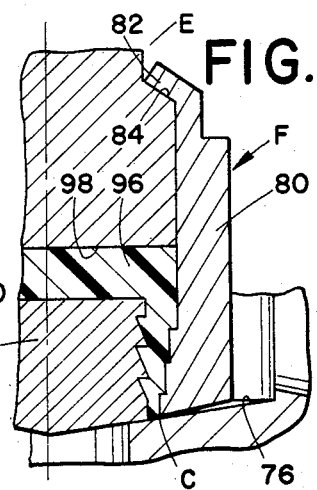

STEM TIP SEAL

BACKGROUND OF THE INVENTION

The subject invention is directed toward the valve art and, more particularly, to an improved stem tip seal structure.

The invention is especially suited for use in a particular diaphragm type shut-off valve and will be described with reference thereto; however, it will be appreciated that the invention is capable of broader application and could be used in a variety of different valves.

Typically, shut-off valves employ a valve member having a relatively soft, resilient material mounted on the end of the valve stem for sealing cooperation with a metal valve seat. A variety of different resilient materials mounted to the stem in different ways have been used in the prior art. While many of the prior art proposals have performed adequtely, seal breakdown, blowout, and chipping and nibbling have been ongoing problems. In addition, certain materials having highly desirably properties, such as high lubricity and resistance to attack by chemicals and high temperature, often produce cold flow and extrusion problems when used as stem tips seals.

Accordingly, there has been an ongoing need for a stem tip seal arrangement which overcomes the noted problems while allowing a variety of seal materials to be used safely and effectively.

SUMMARY OF THE INVENTION

In accordance with the present invention, there is provided a stem seal assembly for a shut-off valve which includes a valve member mounted for selective movement toward and away from an associated valve seat. The seal assembly includes a generally cylindrical sleeve carried by the valve member and having an end defining an outer annular seal surface adapted for cooperative sealing engagement with the associated valve seat. A generally cylindrical rigid body is mounted centrally within the sleeve for limited axial movement and defines a first inner annular seal surface adapted for engagement with the associated valve seat at a location radially inwardly of the first annular seal surface. The cylindrical sleeve and the rigid body cooperate to define an annular chamber which opens axially inwardly from a narrow slot located between the first inner annular seal surface and the outer annular surface. A mass of resilient packing material substantially fills the chamber and extends axially outwardly of the slot to define a second inner annular seal surface. Means are associated with the rigid body for generating pressure on the packing material when the body is forced axially toward the valve member. The first annular seal surface is configured to engage the associated seat prior to engagement by the second inner seal surface and the outer seal surfaces as the valve member moves toward the seat.

In accordance with another aspect of the invention, the outer seal surface is configured to make generally line contact with the associated seat after the first and second inner seal surfaces have engaged the seat.

According to another aspect of the invention, the sleeve has an inner wall configuration such that pressure generated in the packing attempts to move the outer seal surface axially toward the associated seat.

Because the first inner seal surface is located annularly inwardly of the resilient packing and, further, because it makes sealing contact with the seat prior to engagement between the packing and the seat, the packing is brought into engagement with the seat only after substantially all flow through the seat has ceased. Additionally, the force acting from the seat against the rigid body causes the packing to be pressurized and move outwardly of the narrow slot into sealing engagement with the seat. This pressure also causes the outer sealing surface to be held in position relative to the packing and when the outer sealing surface engages the seat the packing is trapped in the slot in firm engagement with the seat.

The relationship between the inner rigid body and the outer sleeve totally encloses the resilient packing to protect it while also preventing it from being extruded or cold flowing. In addition, as the valve is opened the pressure on the packing is released so that the packing does not extrude or cold flow out of the narrow annular slot.

Accordingly, a primary object of the invention is the provision of a stem seal assembly which significantly increases the life of the seals while preventing blowout, cold flow, and the like.

A further object of the invention is the provision of a stem tip seal assembly of the type described which effectively confines the resilient seal material when the valve member is in both an open and closed position.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein:

FIG. 1 is a cross-sectional view of a diaphragm type shut-off valve incorporating a stem tip seal formed in accordance with the subject invention;

FIG. 2 is a greatly enlarged cross-sectional view of the stem tip and seat area of the valve of FIG. 1; and, FIGS. 3-5 are partial cross-sectional views showing the step tip seal and its relation to the associated valve seat at various points in a closing cycle.

DETAILED DESCRIPTION OF THE PREFERRED EMBODIMENT

Referring now to the drawings wherein the showing are for the purpose of illustrating the preferred embodiment of the invention only and not for the purpose of limiting same, FIG. 1 shows a shut-off valve assembly of the general type described and claimed in commonly assigned, co-pending application Ser. No. 482,218, filed Apr. 5, 1983, the disclosure of which is hereby incorporated herein by reference. The primary difference between the valve shown in FIG. 1 and that described and claimed in the aforementioned co-pending application is with respect to the stem seal assembly which will subsequently be described in detail. For present purposes, however, it should be noted that the valve of FIG. 1 generally comprises a valve body A having a bonnet member B connected thereto by a bonnet nut C. The bonnet nut C and the body A are suitably interconnected by threads 12. Additionally, cooperating shoulders indicated generally at 14 are formed between the bonnet nut C and the bonnet B such that upon tightening of bonnet nut C the bonnet B is moved axially toward the body A. A diaphragm D is securely clamped between the upper end of body A and the lower face of bonnet B. The diaphragm D is preferably, sealingly clamped between the body and bonnet by cooperating clamp faces more fully described and claimed in the aforementioned co-pending application.

Extending axially inwardly from the upper end of valve body A is a cylindrical bore 20 having a slightly larger outer end diameter at 22 and a reduced inner end diameter indicated generally at location 24. Inlet and outlet ports or openings 26, 28 connect from the exterior of body A through suitable passages to portion 24 of bore 20, as shown. As can be appreciated, fluid inlet and outlet lines (not shown) can be connected to the inlet and outlet 26, 28, respectively, by any convenient known means.

Positioned centrally in bore 20 is an axially movable valve member E which has an enlarged head portion 30 slidably guided in the larger diameter portion 22 of bore 20. The outer axial end of head 30 faces toward diaphragm D and has a generally spherical configuration. The radial outer periphery of the head 30 is generally hexagonal so that only the corners thereof are guided from the walls of a bore portion 22.

Carried at the lower end of valve member E is the inventive stem tip seal assembly F. As shown, a cylindrical outer surface 32 of assembly F is suitably guided through a guide washer 34 having a cylindrical outer surface closely received in bore 20 and resting on the shoulder between the central portion of bore 20 and the smaller diameter inner end portion 24. Positioned between the guide washer 34 and the enlarged diameter head portion 30 of valve member E is a coil spring 36. The coil spring 36 acts to maintain a continuous upward bias on the valve member E to maintain the spherical upper surface of enlarged head 30 constantly in engagement with the diaphragm D.

Selective operation of the valve member E in a direction axially of the bore 20 is provided by an operating stem 40 which extends axially through the bonnet to a position outwardly thereof. Cooperating external and internal threads between stem member 40 and bonnet member B are generally indicated by numeral 42 and serve to impart axial movement to stem member 40 upon rotational movement thereof relative to the bonnet. An enlarged head 44 on the lower end of stem 40 carries a button 46 formed of plastic or other suitable material. The lower face of buttom 46 is convex and engages the diaphragm D on the opposite side thereof from the enlarged head 30 of valve member E.

Connected at the upper end of stem 40 by suitable splines 50 is an operating member 52 carrying an outwardly extending handle member 54. Operating member 52 is secured to the end of stem 40 by a nut 56 and a lock washer 58. A cover plate 60 snaps into a circular recess in the top of operating member 52 in a known manner.

Associated with the operating member 52 and extending downwardly therefrom is a stop pin 64 which is received in an arcuate groove 66 formed in the upper end of bonnet B. Groove 66 is sized to limit the total range of movement of the operating member 52. Also associated with the operating member 52 and carried at the upper end of the bonnet B is an indicating ring or sleeve member 68 which cooperates with suitable indicia or a pointer carried on operating member 52 to give a visual indication of the position of the valve. In addition, bonnet B is provided with a panel nut member 70 which can be used for mounting the valve through a suitable panel opening (not shown).

As mentioned earlier, the apparatus thus far described in shown and described in great detail in the aformentioned co-pending application Ser. No. 482,218. Of importance to the subject invention is, however, the arrangement of the stem tip seal assembly F. As best shown in FIG. 2, the stem tip seal assembly F is carried at the reduced diameter lower end portion 74 of valve member E and is arranged to sealingly cooperate with an annular seat 76 defined by the bottom wall of portion 24 of bore 20 circumferentially about an axial inlet passage 78. Passage 78 of bore 20 is connected, as shown in FIG. 1, with the inlet port 26.

In the embodiment under consideration, the assembly F includes an outer, imperforate cylindrical sleeve like member 80 which is closely but slidably received on the lower end of valve member E. Preferably, sleeve 80 is formed of metal such as stainless steel and is retained on member E by a pair of tabs 82 which are deformed over the outwardly extending shoulder 84.

Positioned centrally of the sleeve member 80 and axially aligned with valve member E and the seat area 76 is a relatively rigid insert body 88 having a circular lower face 90 of a maximum diameter slightly greater than the diameter of passage 78 and slightly less than the inner diameter of the lower end of sleeve 80. Thus, as illustrated, the insert member 88, in combination with the sleeve 80, defines a narrow slot 94 which extends circumferentially of the lower end face of the seal assembly F. The slot 94 opens inwardly to a chamber 96 defined by the lower end face 98 of stem E, the inner wall of sleeve 80 and the outer side and top surfaces of insert 88.

According to the invention, the chamber 96 is totally filled with a suitable resilient, elastomeric packing or seal material such as polytetrafluoroethylene or the like.

For reasons which will subsequently become apparent, the lower portion of the internal wall of sleeve member 80 is provided with a series of steps or serrations 100 which are arranged to cause the chamber 96 to have a gradually decreasing diameter in directions toward the seat 76. The outer surface of the insert member 88 is similarly provided with reversely oriented serrations or shoulder portions 102.

To assemble the tip assembly thus far described, the seal material 97 is preformed into a generally cup shape with its outer surface shaped to conform to the steps or serrations 100 of sleeve 80 and its inner diameter sized to the maximum diameter of insert 88. The cup shaped mass of packing or seal material 97 is then slid into sleeve 80 from its upper end and the sleeve and seal assembly are slid onto the lower end of valve member E to generally the position shown. Thereafter, the insert 88 is slid axially into position in the seal material 97. With the insert in position, a substantial axial force is applied to end face 90 of insert 88.

As is apparent, with the arrangement thus far described, forces acting axially against lower face 90 of insert 88 generate pressure within the packing mass 97. This causes the packing to mold about the insert 80 and to tend to move downwardly through annular slot 94. Additionally, the internal pressures acting against the sleeve member 80 produce a resultant force tending to move sleeve 80 downwardly on valve member E. When the packing has been suitably pressurized and molded about the insert 88 the tabs 82 of sleeve 80 are bent or deformed over the shoulder 84 and the tip assembly is in its assembled, operative condition.

Referring to FIG. 3, the stem tip seal assembly F is shown in an open position vertically spaced from the seat surface 76. Preferably, the seat surface 76 has a generally conical configuration and forms an angle alpha of approximately 7½° relative to a plane perpendicular to the axis 106 of the seal assembly F. The lower face 90 of the insert F preferably has a conical configuration which lies at an angle alpha relative to a plane perpendicular to axis 106. Angle alpha is preferably also approximately 7½° so that the surface 90 is generally parallel to the seal surface 76. The lower end of sleeve member 80 also has a generally conical configuration and lies at an angle beta which is preferably approximately 15° relative to the plane perpendicualr to axis 106.

As the stem tip seal assembly F is moved axially toward seat 76 engagement between the seat 76 and the seal assembly first takes place in a narrow annular band 101 between the insert 88 and the seat. Preferably, the band 101 has a width W in the range of 0.050 inches or less.

With continued downward movement of valve member E the sealing pressure along band W increases and the pressure within the resilient mass 97 in chamber 96 is increased causing the seal material to extend through slot 94 into engagement with seat 76 in a narrow annular band 103 about the insert 88. Preferably, the insert 88 and the sleeve 80 are sized such that this band has a width in the range of approximately 0.010 inches to 0.020 inches.

With continued downward prssure on valve member E, and the generation of increased pressure within the packing material in chamber 96, the sealing pressure between the narrow band produced by slot 94 and the seat 76 continues to increase and the sleeve 80 finally makes line contact as shown in FIG. 5 and indicated by the point C. This line contact is complete about the outer periphery of the narrow band of resilient seal material extending through slot 94. The seal material is thus totally confined between the insert member 88 and sleeve 80 while engaging seat 76 with substantial force. The relationship between the insert 88 and the sleeve 80 thus totally confines the packing material and prevents it from cold flowing even though it is contacting seat 76 with a relatively high sealing pressure.

The invention has been described in great detail sufficient to enable one of ordinary skill in the art to make and use the same. Obviously, modifications and alterations of the preferred embodiment will occur to others upon a reading and understanding of the specification. It is intended to include all such modifications and alterations insofar as they come within the scope of the appended claims or the equivalents thereof.

Having thus described the invention, it is now claimed:

1. A stem tip seal for a shut-off valve comprising:
   a valve member adapted for selective movement axially toward and away from an associated circular valve seat;
   a generally cylindrical sleeve carried by said valve member and mounted for limited axial movement relative thereto, said sleeve having an end inclined relative to said associated valve seat and defining an outer annular seal surface adapted for cooperative line contact sealing engagement with the associated valve seat;
   a generally cylindrical rigid body mounted axially within said sleeve for limited axial movement and defining a first inner annular seal surface adapted for engagement with the associated valve seat at a location radially inwardly of said outer annular seal surface;
   an annular chamber formed between said sleeve and said rigid body, said chamber opening axially inwardly from a narrow annular slot located between said first inner annular seal surface and the outer annular seal surface;
   a mass of resilient packing material substantially filling said chamber and extending axially outwardly of said slot to define a second inner annular seal surface;
   means associated with said rigid body for generating pressure on said packing material when said body is forced axially toward said valve member; and,
   said first inner annular seal surface being configured and positioned to engage the associated seat prior to engagement by either said second inner annular seal surface or said outer annular seal surface as said valve member moves toward the seat.

2. The stem tip seal as defined in claim 1 wherein said second inner annular seal surface is configured to make contact with the associated seat along a narrow annular band having a width no greater than 0.02 inches.

3. The stem tip seal as defined in claim 1 wherein said sleeve has an inner wall configuration such that pressure generated in said packing acts to attempt to move said outer annular seal surface axially toward the associated seat.

4. The stem tip seal as defined in claim 1 wherein said chamber has a generally increasing cross-sectional area axially inwardly of said slot.

5. The stem tip seal as defined in claim 1 wherein said first inner annular seal surface has a generally conical configuration and wherein said associated seat is parallel to said first inner annular seal surface.

6. A stem tip seal for a shut-off valve comprising:
   a valve member adapted for selective movement axially toward and away from an associated circular valve seat;
   a generally cylindrical sleeve carried by said valve member and having an end defining an outer annular seal surface adapted for cooperative sealing engagement with the associated valve seat;
   a generally cylindrical rigid body mounted axially within said sleeve for limited axial movement and defining a first inner annular seal surface adapted for engagement with the associated valve seat at a location radially inwardly of said outer annular seal surface;
   an annular chamber formed between said sleeve and said rigid body, said chamber opening axially inwardly from a narrow annular slot located between said first inner annular seal surface and the outer annular seal surface;
   a mass of resilient packing material substantially filling said chamber and extending axially outwardly of said slot to define a second inner annular seal surface;
   means associated with said rigid body for generating pressure on said packing material when said body is forced axially toward said valve member;
   said first inner annular seal surface being configured to engage the associated seat prior to engagement by said second inner annular seal surface and said outer annular seal surface as said valve member moves toward the seat; and, said packing material fully enclosing said rigid body axially inwardly of said slot, and wherein the radial exterior of said body has an axial series of circumferential grooves.

7. The stem tip seal of claim 6 wherein the interior of said sleeve has an axial series of circumferential grooves facing the circumferential grooves on said body.

8. The stem tip seal of claim 3 including means for limiting the axial outward movement of said sleeve.

9. A stem tip seal for a shut-off valve comprising:

a valve member adapted for selective movement axially toward and away from an associated circular valve seat;

a rigid sleeve member mounted on said valve member and having an axial end defining an outer annular seal surface adapted for cooperative engagement with the associated valve seat;

a mass of resilient packing material mounted within said sleeve;

a rigid body located centrally within said packing material and defining a first inner annular seal surface facing axially outwardly for cooperation with the associated seat at a location radially inwardly of said outer annular seal surface;

said first inner annular seal surface and said outer annular seal surface being spaced to define a circumferentially continuous narrow slot about said body through which a portion of said packing material can extend to define a second inner annular seal surface for cooperation with said associated seat;

means associated with said rigid body for generating pressure within said packing material when pressure is applied to said rigid body in an axial direction toward said valve member;

said outer and first annular seal surfaces configured relative to said associated seat to cause said first annular seal surface to engage the associated seat prior to said outer seal surface and said second inner annular seal surface when said valve member is moved toward said associated seat.

10. The stem tip seal as defined in claim 9 wherein said first annular seal surface and said outer annular seal surface both have a generally conical configuration, with said first annular seal surface being inclined at a lesser angle than said outer annular seal surface and wherein said associated seat is parallel to said first annular seal surface.

11. The stem tip seal as defined in claim 10 wherein said first inner annular seal surface and said outer seal surface are both inclined in a radial direction at different angles relative to one another.

12. The stem tip seal as defined in claim 10 wherein said first and second inner annular seal surfaces each have a width in the range of 0.050 inches or less.

* * * * *